(12) United States Patent
Meier et al.

(10) Patent No.: US 11,519,138 B2
(45) Date of Patent: Dec. 6, 2022

(54) SOIL PROCESSING MACHINE

(71) Applicant: Hamm AG, Tirschenreuth (DE)

(72) Inventors: Matthias Meier, Tirschenreuth (DE); Christopher Prechtl, Falkenberg (DE)

(73) Assignee: HAMM AG, Tirschenreuth (DE)

( * ) Notice: Subject to any disclaimer, the term of this patent is extended or adjusted under 35 U.S.C. 154(b) by 388 days.

(21) Appl. No.: 16/715,158

(22) Filed: Dec. 16, 2019

(65) Prior Publication Data

US 2020/0190749 A1 Jun. 18, 2020

(30) Foreign Application Priority Data

Dec. 17, 2018 (DE) ...................... 10 2018 132 378.6

(51) Int. Cl.
| | |
|---|---|
| *E01C 19/25* | (2006.01) |
| *B60D 1/145* | (2006.01) |
| *B60G 17/08* | (2006.01) |
| *B62D 12/00* | (2006.01) |
| *B62D 55/084* | (2006.01) |
| *E01C 19/26* | (2006.01) |
| *E01C 19/28* | (2006.01) |

(52) U.S. Cl.
CPC ............ *E01C 19/255* (2013.01); *B60D 1/145* (2013.01); *B60G 17/08* (2013.01); *B62D 12/00* (2013.01); *B62D 55/084* (2013.01); *E01C 19/266* (2013.01); *B60G 2500/30* (2013.01); *E01C 19/281* (2013.01); *E01C 19/282* (2013.01)

(58) Field of Classification Search
CPC ...... E01C 19/23; E01C 19/266; E01C 19/281; E01C 23/127; E01C 2301/00
See application file for complete search history.

(56) References Cited

U.S. PATENT DOCUMENTS

| | | | | |
|---|---|---|---|---|
| 3,867,052 | A * | 2/1975 | Durham | .................. E02D 3/026 404/121 |
| 3,986,782 | A * | 10/1976 | Durham | ................ E01C 19/255 404/85 |
| 4,147,448 | A * | 4/1979 | Jeffery | .................... E02D 3/046 404/124 |

(Continued)

FOREIGN PATENT DOCUMENTS

EP          2 142 706        11/2008

*Primary Examiner* — Gary S Hartmann
(74) *Attorney, Agent, or Firm* — Rankin, Hill & Clark LLP

(57) ABSTRACT

A soil processing machine includes a machine frame with two longitudinal beams substantially extending in the longitudinal direction of the machine and two transverse beams substantially extending transverse to the longitudinal beams. A soil-processing roller is supported in the longitudinal direction between the transverse beams on the longitudinal beams so that it can rotate about an axis of rotation of the roller. A coupling arrangement is provided on the machine frame for attaching the machine frame to a further machine frame of the soil-processing machine or to a further machine. A lifting/supporting arrangement is provided on the machine frame for lifting and/or supporting the machine frame in relation to the ground. One of the transverse beams is supported on the two longitudinal beams so that it can rotate about a swivel axis substantially parallel to an axis of rotation of the roller.

21 Claims, 3 Drawing Sheets

(56) References Cited

U.S. PATENT DOCUMENTS

| | | | | |
|---|---|---|---|---|
| 5,676,490 A * | 10/1997 | Nelson | ............... | E01C 23/0993 |
| | | | | 404/94 |
| 7,410,323 B1 * | 8/2008 | Roth | ................... | E01C 19/235 |
| | | | | 404/132 |
| 9,915,040 B2 * | 3/2018 | Bletscher | ............... | E02F 3/961 |
| 9,988,774 B2 * | 6/2018 | Howe | ................... | E01C 23/12 |
| 2010/0098521 A1 * | 4/2010 | Kartal | ................. | E01C 19/281 |
| | | | | 404/117 |
| 2019/0323193 A1 * | 10/2019 | Stromsoe | ............ | E01C 19/266 |

\* cited by examiner

SOIL PROCESSING MACHINE

BACKGROUND

The present invention relates to a soil processing machine that can process, for example, compact the soil by means of a soil-processing roller supported in relation to a machine frame so that it can rotate.

From EP 2 142 706 B1 a soil processing machine is known comprising a machine frame that can be attached to a tractor by means of a coupling arrangement comprising a drawbar unit and by this, the compacting roller resting on the soil can be drawn over the soil to be compacted. A chassis arrangement provided with this known soil-processing machine comprises a wheel mounted so that it can rotate on a machine frame on each of the two longitudinal beams of the machine frame. To enable the soil-processing roller not to be in contact with the soil and thus with soil-processing machine can roll on the wheels supported so that they can rotate on the longitudinal beams, in a transitional operating state in which no soil is to be compacted by means of the compacting roller but the processing machine is to be towed to the soil to be compacted, a mechanism is provided by which the soil-processing roller can be raised or lowered in relation to the machine frame.

It is the task of the present invention to provide a soil-processing machine in which in a simple manner a soil-processing roller can be attached to and decoupled from the machine frame.

BRIEF SUMMARY

According to the invention, this task is solved by a soil-processing machine, comprising:
- a machine frame with two longitudinal beams arranged mutually spaced transverse to a longitudinal direction of the machine, essentially extending in the longitudinal direction of the machine and two transverse beams arranged mutually spaced in the longitudinal direction of the machine, essentially extending transverse to the longitudinal direction of the machine.
- a soil-processing roller supported on the longitudinal beams so that it can rotate about an axis of rotation of the roller in a longitudinal direction of the machine between the transverse beams,
- a coupling arrangement for coupling the machine frame to a further machine frame of the soil-processing machine or to a further machine,
- a lifting/supporting arrangement provided on the machine frame for raising and/or supporting the machine frame in relation to the ground, wherein one of the transverse beams is supported on both longitudinal beams so that it can swivel about a swivel axis that is essentially parallel to the axis of rotation of the roller.

In a soil-processing machine constructed according to the invention, while changing over a soil-processing roller, the machine frame can be basically be supported by the lifting/supporting arrangement in relation to a floor, so that even with the soil-processing roller removed from the machine frame, the machine frame is held in a defined position above the floor and is particularly in a position suitable for installing a soil-processing roller. The removal and/or lifting movement of the soil-processing roller from or to the machine frame is thus made easier or even made possible, so that one of the transverse beams is connected to the longitudinal beams fundamentally so that it can swivel and therefore can be brought into a position which does not hinder the movement of the compacting roller to or from the machine frame particularly if the machine frame is supported in relation the ground by the lifting/supporting arrangement.

To be able to make available in a simple manner the movement clearance required for installing or removing a compacting roller, it is proposed that one of the transverse beams is supported so that it can swivel in a height direction in the upper region of the same on the longitudinal beams.

As such a transverse beam is a heavy component ensuring the required stability, this can be allocated to a swivel drive driving the transverse beam for swivelling about the swivel axis. Moving by hand is then not required.

For example, the required actuation force can be generated, if the swivel drive comprises at least one piston/cylinder unit, preferably allocated to each longitudinal beam one in relation to one transverse beam and one supported by the longitudinal beam.

One of the transverse beams may be able to swivel by the swivel drive between a roller operational position and a roller installation position, wherein in the roller operational position one of the transverse beams is connected or connectable rigidly with the longitudinal beams and so that is immobile in relation to this and is swivelled upwards in the roller installation position in relation to its positioning in the roller operational position in a height direction.

Also to enable movement of the soil-processing machine in the effective lifting/supporting arrangement and particularly with the soil-processing roller removed from the machine frame, it is proposed that the lifting/supporting arrangement comprises a chassis arrangement with at least one chassis unit supported on the machine frame so that it is height adjustable.

In so doing, the chassis arrangement allocated to each longitudinal beam comprises a chassis unit supported on the longitudinal beam so that it is height adjustable. It is particularly advantageous in this case to compensate for uneven or inclined ground if each chassis unit is supported independently of the other chassis unit so that it is height adjustable on the allocated longitudinal beam.

A stable construction may, for example, be achieved in that each chassis unit is connected so that it can swivel in a connection region to the allocated longitudinal beams and is supported in a height adjustment region in relation to the allocated longitudinal beam over a height adjustment arrangement arranged spaced in relation to the connection region in the longitudinal direction of the machine. The height adjustment may, for example, comprise a piston/cylinder unit or a spindle unit.

Each chassis unit may comprise a chassis girder attached in the connection region to the longitudinal beam such that it can swivel and connected to the height adjustment arrangement in the height adjustment region.

To be able to ensure a stable support of the soil-processing machine on the ground or floor by means of the lifting/supporting arrangement, each chassis unit may exhibit a soil-processing machine support surface region extending in the longitudinal direction of the machine, and the axis of rotation of the roller may be positioned in the longitudinal direction of the machine between a first support surface region longitudinal end and a second support surface region longitudinal end.

For a low distributed load, it is proposed that each chassis unit comprises a track chassis. In so doing, the track chassis may be connected to the chassis beam essentially freely able to swivel.

In the configuration of the soil processing machine as a non-self-propelled machine it is proposed that the soil processing machine is able to be connected to a tractor for moving in the longitudinal direction of the machine by means of the coupling arrangement. This does not rule out one or more chassis units of such soil-processing machines being allocated to a chassis drive that may provide, for example, a supporting drive moment.

For a stable connection of the soil-processing machine with a tractor, the coupling arrangement may comprise a drawbar unit preferably rigidly connected to a machine frame with a coupling formation, preferably coupling socket, for attaching to a counter-coupling formation provided for a tractor, preferably a trailer ball.

In the configuration of the soil-processing machine as self-propelled soil-processing machine, a drive unit can be provided on the additional machine frame providing a rear end of the soil processing machine, and the coupling arrangement may comprise a steering linkage arrangement for coupling so that it can swivel with the additional machine frame about a steering linkage axis of a machine frame providing a front end of the soil processing machine. In such a soil processing machine, generally also designed as single-drum compactor, for example, wheels on the rear end driven by a drive unit arranged there or an additional soil-processing roller drive for rotation may be provided. Also a control panel for a controller operating the soil-processing machine may be provided on the rear end.

The invention furthermore relates to a soil processing train, comprising a tractor and a soil-processing machine, as has been described above as a non-self-propelled soil-processing machine, attached to the tractor.

The invention furthermore relates to a process for removing a soil-processing roller from a soil-processing machine constructed according to the invention, comprising the measures:

a) Positioning the lifting/supporting arrangement in such a way that the machine frame is supported with the soil-processing roller supported on a floor by the lifting/supporting arrangement in relation to the floor,
b) After undertaking the measure a), releasing the soil-processing roller from the longitudinal beams;
c) Before or after undertaking measure b), swivelling one of the transverse beams into a roller installation position,
d) After undertaking measures b) and c), moving the machine frame in relation to the soil-processing roller essentially in the longitudinal direction of the machine frame.

In this process, to avoid mutual disruption between the machine frame and by the soil processing roller released from the same, for undertaking the measure d), the machine frame may be raised by means of the lifting/supporting arrangement in such a way that when undertaking measure d) the machine frame can be moved away over the soil-processing roller with transverse beams swivelled in the roller installation position.

BRIEF DESCRIPTION OF THE DRAWINGS

The present invention will be described in detail in the following in relation to the appended figures. In which.

DETAILED DESCRIPTION

Figure 1:
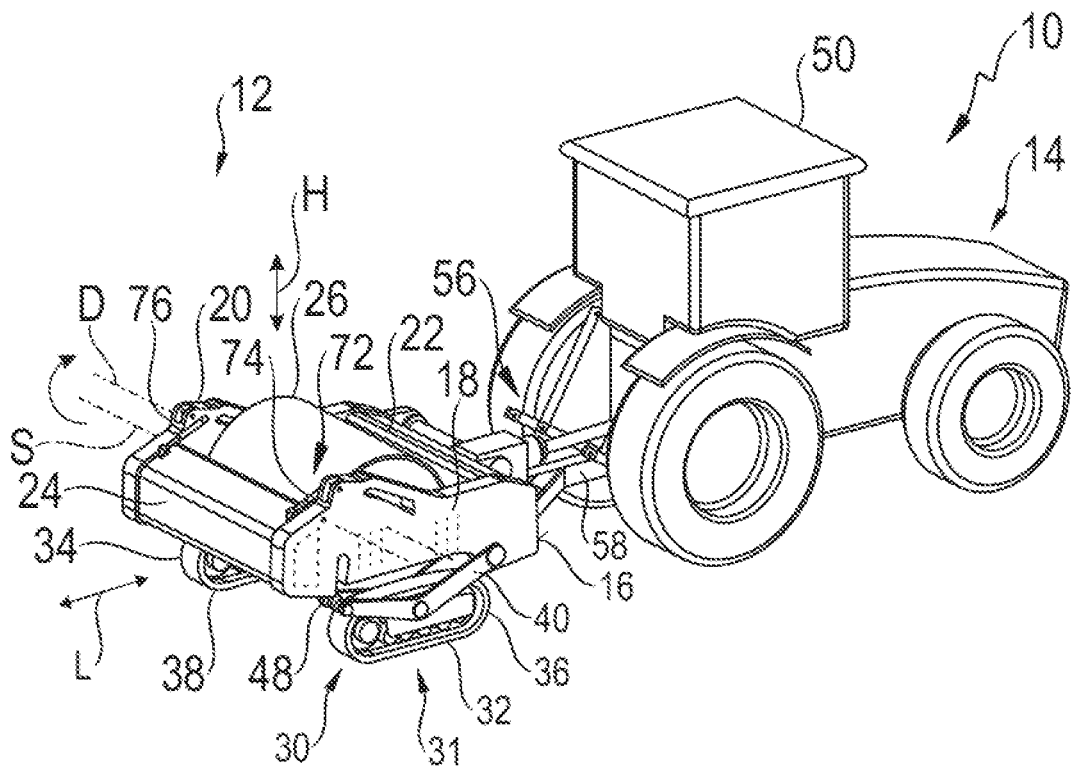
FIG. 1 shows a soil-processing train with a soil-processing machine and a tractor pulling the same.

FIG. 1 shows a soil-processing train generally designated 10. The soil-processing train 10 comprises a soil-processing machine 12 and a tractor 14 pulling or pushing a soil-processing machine 12.

The soil-processing machine 12 constructed as a non-self-propelled machine comprises a machine frame 16 with two longitudinal beams 18, 20 arranged mutually spaced transverse to the longitudinal direction L of the machine and extending in the longitudinal direction L of the machine. In both longitudinal end regions, the longitudinal beams 18, 20 are connected to transverse beams 22, 24.

Figure 3:
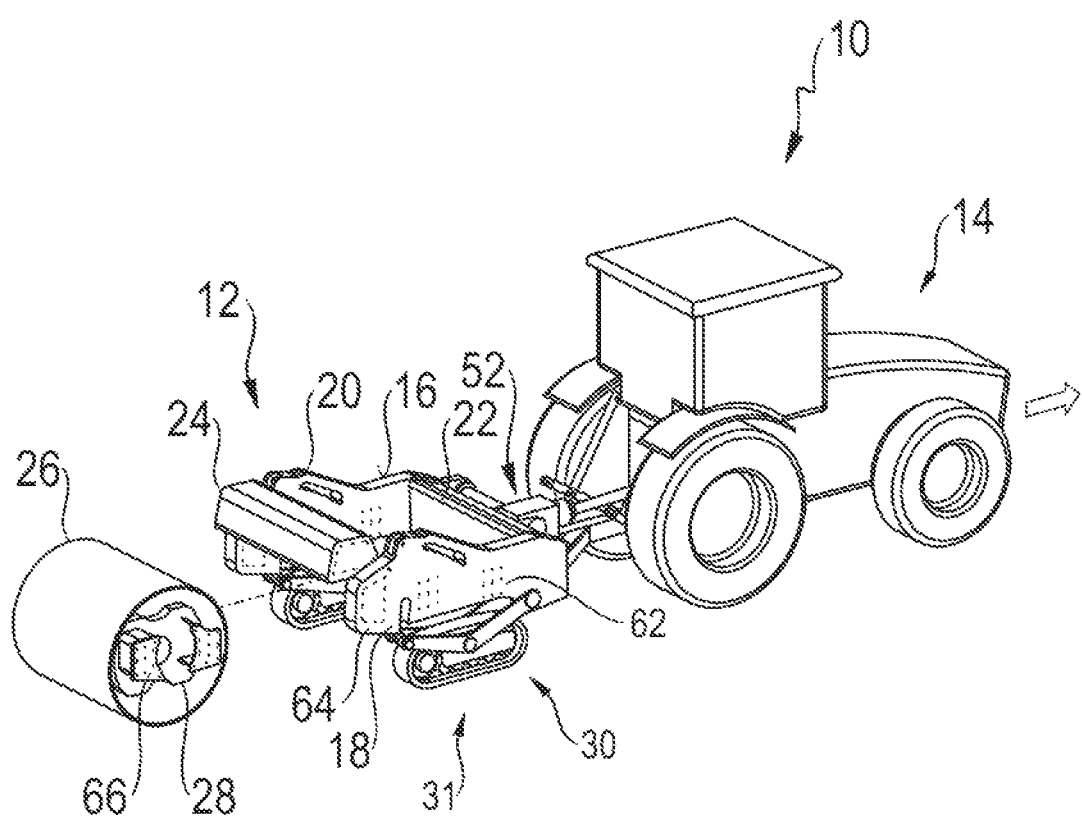
FIG. 3 shows the soil-processing train of FIG. 2 with a soil-processing roller removed from a machine frame of the soil-processing machine.

In the inner space surrounded by the longitudinal beams 18, 20 and the transverse beams 22, 24, a soil-processing roller 26 is taken up. The soil-processing roller 26 is supported so that it can rotate on the longitudinal beams 18, 20 about an axis of rotation D of the roller. To do this, on both longitudinal end regions of the soil-processing roller 26 situated in the direction of the axis of rotation D of the roller supporting units 28 respectively recognisable in FIG. 3 are provided which may be fastened by screwing to the relevant allocated longitudinal beams 18, 20 and the soil-processing roller 26 is supported so that it can rotate about the axis of rotation D of the roller.

The soil-processing machine 12 furthermore comprises a chassis arrangement generally designated with 30. The chassis arrangement 30 essentially forms a lifting/supporting arrangement 31 and comprises in the arrangement on each of the two longitudinal beams 18, 20 a chassis unit 32, 34 respectively with a track chassis 36, 38. As can be recognisable using the chassis unit 32, the relevant track chassis 36, 38 is supported so that it can swivel on a chassis girder 40 in an approximately central coupling region 42 of the same in the longitudinal direction of the machine L about an axis of rotation D of the roller in the essentially parallel axis. In one if its two end regions positioned in the longitudinal direction L of the machine, the chassis girder 40 forms a coupling region 44, in which the chassis girder 40 is supported so that it can swivel on the allocated longitudinal beam 18 and 20 about an axis of rotation D in the essentially parallel axis. In its other end region, the relevant chassis girder 40 forms a height adjustment region 46. In this height adjustment region 46, the chassis girder 40 is supported in relation to the respectively allocated longitudinal beam 18, 20 by a height adjustment arrangement generally designated with 48. The height adjustment arrangement 48 may, for example, comprise a piston/cylinder unit that is supported on the one hand in the height adjustment region 46 of the chassis girder 40 and on the other hand at the allocated longitudinal beam 16, 18. By extending or even contracting the piston/cylinder unit, the height positioning of the height adjustment region 46 in relation to the machine frame 16 may be changed and thus with a chassis unit 32, 34 standing on the ground, the height of the machine frame 16 above the ground may be adjusted. The actuate the height adjustment arrangements 48 provided in the allocation to both chassis units 32, 34, in an operational state 50 of the tractor 14 controls may be provided that enable an operator to adjust the height position of both chassis units 32, 34 mutually independently. In the formation of the height adjustment arrangements 48 respectively with a piston/cylinder unit, the pressure fluids duly required may be provided by connecting the piston/cylinder units to the pressure fluid circuit of the tractor 14. It is to be noted that the height adjustment arrangements 48 may also respectively be formed with a spindle unit, for example. Such a spindle unit may comprise a spindle rod provided with an external thread and a spindle nut provided with an internal thread and engaging with the external thread of the spindle rod. A drive may be allocated to the spindle rod or the spindle nut, so that by rotating the spindle rod or the spindle nut, the spindle nut may be moved along the spindle rod and in this manner the height position of the machine frame 16 may be adjusted in relation to the chassis arrangement 30.

It is to be noted that the chassis units 32, 34 of the chassis arrangements may also even not be driven in the configuration as a relevant track chassis 36, 38, so that the soil-processing machine 12 is moved exclusively by the tractor 14. Alternatively, it is possible, in allocation to the chassis units 32 to be able to provide motors respectively driving these, for example, pressure fluid motors, to be able to supply supporting driving force. Furthermore, it can be recognised in the figures, that the axis of rotation D of the roller is positioned in the longitudinal axis of the machine approximately above the coupling region 32 and in the region of a supporting surface A of the relevant track chassis 36 or even 38 provided between a first support surface region longitudinal end 52 and a second support surface region longitudinal end 54. This ensures stable standing or even a uniform distributed load on the ground.

The chassis units 32, 34 may, instead of the track chassis, for example, also comprise a plurality of wheels positioned one behind the other. In such a formation, the support surface region is essentially defined in the longitudinal direction of the machine by an overall surface which is defined between the wheels or even their support surfaces standing on the ground respectively in the front and rear end regions in the longitudinal direction L of the machine.

For coupling the soil processing machine 12 to the tractor 14, for example, on the transverse beam 22, a coupling arrangement is provided, generally designated with 56. This comprises a drawbar unit 58 rigidly fastened to the transverse beam 22, for example. In the end region of the drawbar unit 58 not shown in the figure is provided, for example, a coupling arrangement formed in the shape of a coupling socket, that may be brought into coupling engagement with, for example, a trailer ball formed as a counter-coupling formation on the tractor 14. In the state attached to the tractor 14, via, for example, a transmission mechanism 60 attached to the power takeoff of the tractor 14, a drive torque may be supplied for a reciprocating mechanism arranged inside the soil-processing roller 26. This may comprise one or more out-of-balance masses, for example, able to be driven in rotation about the axis of rotation D of the roller so that, in soil-processing operation corresponding to the rotational speed of the out-of-balance masses, a force or even acceleration is exerted on the soil-processing roller 26 orthogonal to the axis of rotation D of the roller, preferably essentially oriented in a height direction H.

Whereas in the soil-processing machine 12 the transverse beam 22 also supporting the coupling arrangement 56 may also be connected rigidly and unremovably to both longitudinal beams 18, 20, for example, by welding, the supporting units 28 of the soil-processing roller 26 and the transverse beam 24 may are connected removably to the longitudinal beams 18, 20. To do this, in the longitudinal beams 18, 20 allocated to the supporting units 28 on the one hand and allocated to the transverse units 24 on the other hand, respective groups of breakthrough holes 62 or even 64 are provided. Fastening screws may be guided through these and screwed into groups of threaded holes 66 respectively allocated to these on the support units 28 on the one hand and 68 on the transverse beam 24 on the other hand. Thus, by a plurality of threaded bolts, a fastened connection of the supporting units 28 and the transverse beam 24 to the longitudinal beam 18, 20 may be assured. In particular, allocated to the supporting units 28, it may also be provided that the threaded bolts are guided through holes provided in these and connected with nuts screwed onto the same to produce a fastened connection.

Figure 2:
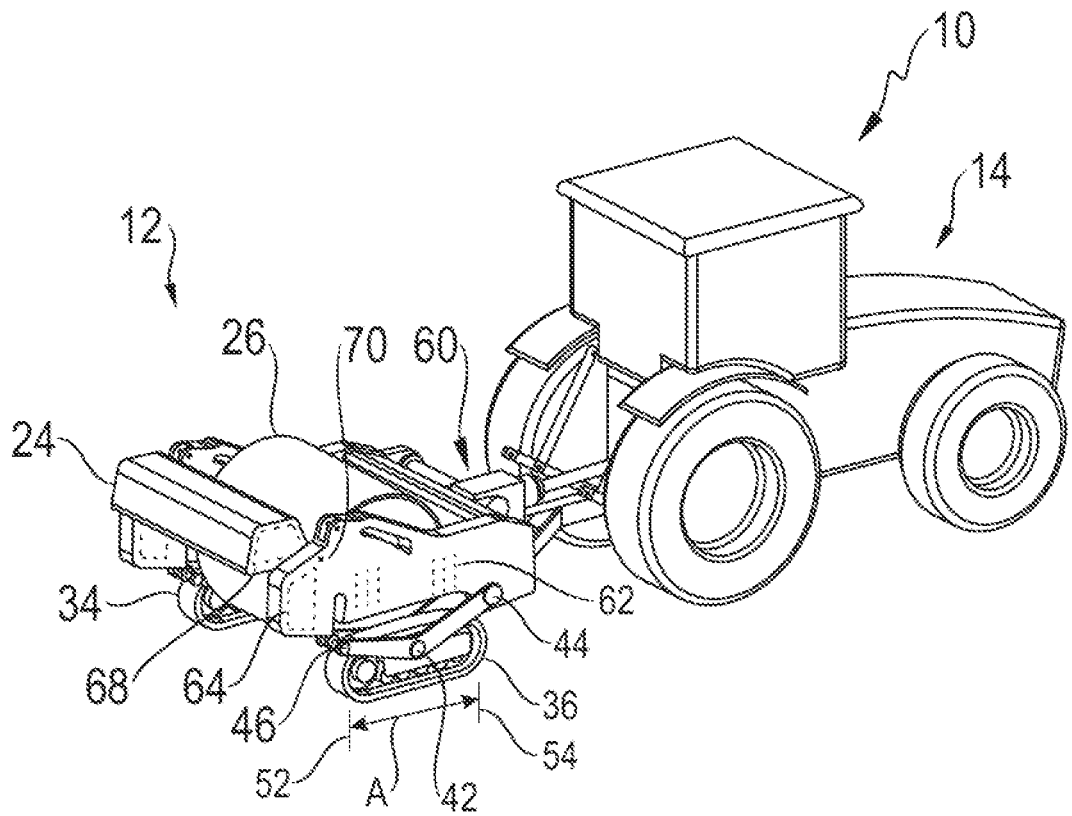
FIG. 2 shows the soil-processing train of FIG. 1 with a transverse beam swivelled in a roller installation position.

The transverse beam 24 is also supported on this by connection produced by threaded bolts to the longitudinal beams 18, 20 on this such that it can swivel about a swivel axis S, for example, essentially parallel to the axis of rotation D of the roller. Also, for example, threaded bolts placed through the longitudinal beams 18, 20 and screwed into the transverse beams 24 or other non-removable swivel pins, may also be used for this. The swivel axis S is positioned in the height direction H in the upper region of the transverse beam 24 or even also the longitudinal beam 18, 20. For swivelling the transverse beam 24 from the roller operating position illustrated in FIG. 1, in which the transverse beam 24 may be firmly fastened in the manner described above to the longitudinal beams 18, 20, for example, with the screw connection, in the roller installation position illustrated in FIG. 2, in which the transverse beam 24 is swivelled upwards in the height direction H, the transverse beam 24 is generally allocated a swivel drive designated with 72. This comprises, in the example illustrated, two piston/cylinder units 74, 76, that engage on the one hand with the longitudinal beams 18, 20 and on the other hand the end regions of the transverse beam 24 positioned transverse to the longitudinal direction of the machine. By feeding or even discharging pressure fluid to or even from the piston/cylinder units 74, 76, these may be extended or even contracted so that the transverse beam 24 is adjustable between the two positions illustrated in FIG. 1 and FIG. 2. Also, the feed/discharge of pressure fluid to or even from the piston/cylinder units 74, 76 may be done by corresponding controls in the control panel 50. The pressure fluid duly required may be tapped from the pressure fluid circuit of the tractor 14.

With the soil-operating train 10 in operation, when the soil-operating machine 12 is to be transported to the soil to be processed, the chassis arrangement 30 is actuated in such a way that both chassis units 32, 34 are swivelled downwards in relation to the machine frame 16 or even the machine frame 16 is raised so that with this, the soil-processing roller 16 may also be raised and is not in contact with the ground. Only when the soil to be processed is reached may the machine frame 16 be lowered so that the soil-processing roller 26 comes into contact with the soil to be processed and alone or, as the case may be, with support by the chassis units 32, 34 the load supplied essentially by the weight of the entire soil-processing machine 12 is supported and directed into the soil. In this state, the soil-processing roller 26 may then be used, for example, to compact the soil, if it is formed essentially with a smooth external circumferential surface. If the soil-processing roller 26 is formed, for example, with structured external circumferential surface, it may also be used to break up solid ground.

To adapt the soil-processing machine 12 to various working requirements, it may be required to replace the soil-processing roller 26. Also for repair work, it may be required to remove the soil-processing roller 26 from the machine frame 16. This may be done in the soil-processing machine 12 illustrated in the figures by lowering both chassis units 32, 34 far enough that the soil-processing machine 12 rests on the ground on the one hand with the chassis units 32, 34 and on the other hand with the soil-processing roller 26. Already before or after positioning the chassis units 32, 34 in this state, the transverse beam 24 may be swivelled into the roller installation position illustrated in FIG. 2. Before and after swivelling the transverse beam 24 into the roller installation position, the supporting units 28 may be removed on the threaded pins connecting the longitudinal beams 18, 20, so that fundamentally, the soil-processing roller 26 supported on the ground is removed from the machine frame 16. Self-evidently, in so doing, also any mechanical drive connections activated mechanically or with pressure fluid, which is directed, for example, to drive the reciprocating mechanism in the soil-processing roller 26 are to be disconnected.

Subsequently, the machine frame 16 may then be raised by corresponding actuation of the chassis units 32, 34 or even the height adjustment arrangements 48 of the same, so that the transverse beam 24 already swivelled into its roller installation position is positioned in the height direction H completely above the soil-processing roller 26. As appropriate, swivelling the transverse beam 24 into the roller installation position may only be done if, after detaching the soil-processing roller 26 from the machine frame 16 this has been raised by corresponding actuation of the height adjustment arrangements 48.

Subsequently, by moving the machine frame 16 essentially in the longitudinal direction L of the machine, this is moved away with the transverse beam 24 swivelled into the roller installation position over the soil-processing roller 26 supported on the ground, so that, as this is illustrated in FIG. 3, the soil-processing roller 26 is freely resting and is accessible, for example for repair or maintenance work or the machine frame may 16 be coupled to another soil-processing roller.

To couple a soil-processing roller 26 with the machine frame 16, the previously listed working steps may be undertaken in the reverse order. This means that first the machine frame 16 is moved away with the transverse beam 24 swivelled in the roller installation position over the soil-processing roller 26. Before or after the transverse beam 24 is swivelled into its roller operational position illustrated in FIG. 1, the installation frame 16 may be lowered so that the supporting units 28 may be connected to both longitudinal beams 18, 20 and also the mechanical or hydraulic connection of the soil-processing roller 26 may be done to a corresponding drive system of the soil-processing machine 12 or even the tractor 14. Subsequently, the soil-processing machine 12 is then provided for guiding through the soil-processing processes again.

Figure 4:
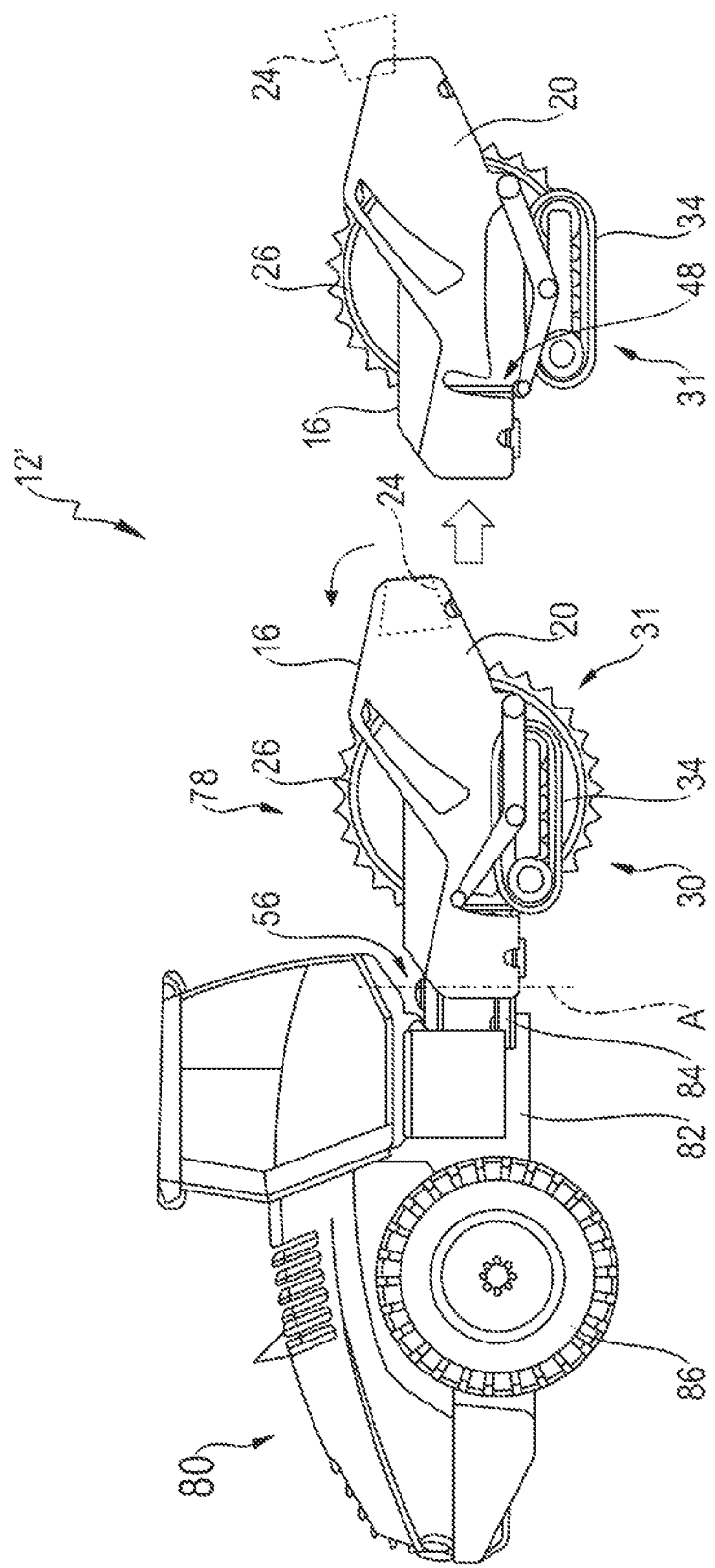
FIG. 4 shows a self-propelled soil-processing machine.

An alternative formation of a soil-processing machine 12' is illustrated in FIG. 4. In this formation, the soil-processing machine 12 is formed as a self-propelled soil-processing machine. The machine frame 16 forms the or one part of a front end 78. A rear end 80 provides a further machine frame 82 which is connected to the machine frame 16 or even the front end 78 through a steering linkage arrangement 84 so that it can be swivelled about a steering axis A. The steering linkage arrangement 84 essentially provides the coupling arrangement 56 by which the machine frame 16 supporting the soil-processing roller 26 is attached to the further machine frame 82.

On the rear end 80 a drive unit is provided, by which on the one hand the energy required for operating the soil-processing machine 12' is supplied and particularly also drive wheels 86 provided on the rear end 80 for forward motion of the soil-processing machine 12' may be driven. Instead of the drive wheels 86 provided on both sides on the rear end 80, in this alternatively a further soil-processing roller that can be driven in rotation by the drive unit may also be provided.

Allocated to the front end 78 or even to the machine frame 16 the chassis arrangement 30 is provided with its two chassis units, of which in FIG. 4 the chassis unit 34 provided for allocation to the longitudinal beam 20 is recognisable.

Recognisable is also the transverse beam 24 fundamentally concealed in this illustration which is in its roller operational position. To remove and install the soil-processing roller 26, as described above, firstly the front end 18 is set down with the soil-processing roller 16 and the chassis arrangement 30 on the ground. After detaching the soil-processing roller 26 from the longitudinal beams, as indicated on the right of FIG. 4 in a transitional phase, the machine frame 16 may be raised. Before or after removing the soil-processing roller 26 from the machine frame 16 or raising the machine frame 16, the transverse beam 24 may be swivelled into its roller installation position. Subsequently, the soil-processing machine 12 with front end 78 and rear end 80 may be moved in the illustration of FIG. 4 to the left, therefore backwards, to move the machine frame 16 away from the soil-processing roller 26.

The invention claimed is:

1. Soil-processing machine, comprising:
   a machine frame with two longitudinal beams substantially extending in the longitudinal direction of the machine and two transverse beams substantially extending transverse to the longitudinal beams,
   a soil-processing roller supported on the longitudinal beams between the transverse beams so that the soil-processing roller is able to rotate about an axis of rotation of the roller,
   a coupling arrangement provided on the machine frame for coupling the machine frame to a further machine frame of the soil-processing machine or to a further machine, and
   a lifting/supporting arrangement for raising and/or supporting the machine frame in relation to a ground is provided on the machine frame,
   wherein one of the transverse beams is pivotally supported on both longitudinal beams so that said one of the transverse beams is able to swivel about a swivel axis relative to the longitudinal beams, wherein said swivel axis is substantially parallel to the axis of rotation of the roller.

2. Soil-processing machine according to claim 1, wherein the swivel axis is positioned in an upper region of the one of the transverse beams and the longitudinal beams in a height direction, so that said one of the transverse beams is able to swivel in the upper region of the longitudinal beams.

3. Soil-processing machine according to claim 1, wherein a swivel drive is provided for driving said one of the transverse beams to swivel about the swivel axis.

4. Soil-processing machine according to claim 3, wherein the swivel drive comprises at least one piston/cylinder unit.

5. Soil-processing machine according to claim 4, wherein the at least one piston/cylinder unit is one allocated to the longitudinal beam in relation to a transverse beam and one supported on the longitudinal beams.

6. Soil-processing machine according to claim 3, wherein said one of the transverse beams is driven by the swivel drive to swivel between a roller operational position and a roller installation position, wherein in the roller operational position said one of the transverse beams is at least partially removably connected with the longitudinal beams so as to be immobile in relation to the longitudinal beams, and, after being at least partially disconnected, is swivelled upwards to the roller installation position.

7. Soil-processing machine according to claim 1, wherein the lifting/supporting arrangement comprises a chassis arrangement with at least one chassis unit height adjustably supported on the machine frame.

8. Soil-processing machine according to claim 7, wherein the chassis arrangement at each one of the longitudinal beams includes a chassis unit height adjustably supported on the longitudinal beam.

9. Soil-processing machine according to claim 8, wherein the chassis units supported on the two longitudinal beams are height adjustable independently from each other.

10. Soil-processing machine according to claim 8, wherein each chassis unit is connected in a connection region to one of the longitudinal beams so that each chassis unit is able to swivel, and in a height adjustment region is supported by a height adjustment arrangement so that each chassis unit is height adjustable in relation to the one of the longitudinal beams, wherein the height adjustment region is arranged spaced in relation to the connection region in the longitudinal direction of the machine.

11. Soil-processing machine according to claim 10, wherein the height adjustment arrangement comprises a piston/cylinder unit or a spindle unit.

12. Soil-processing machine according to claim 10, wherein each chassis unit comprises a chassis girder attached in the connection region to the longitudinal beam such that the chassis girder is able to swivel and be connected to the height adjustment arrangement in the height adjustment region.

13. Soil-processing machine according to claim 8, wherein each chassis unit exhibits a soil-processing machine support surface region extending in the longitudinal direction of the machine, wherein the axis of rotation of the roller is positioned in the longitudinal direction of the machine between a first longitudinal end of the support surface region and a second longitudinal end of the support surface region.

14. Soil-processing machine according claim 8, wherein each chassis unit comprises a track chassis.

15. Soil-processing machine according to claim 12, wherein each chassis unit comprises a track chassis, and wherein the track chassis is connected to the chassis girder substantially freely able to swivel.

16. Soil-processing machine according to claim 1, wherein the soil-processing machine is able to be attached to a tractor for moving in the longitudinal direction of the machine by means of a coupling arrangement.

17. Soil-processing machine according to claim 16, wherein the coupling arrangement comprises a drawbar unit for attaching to a counter-coupling formation provided for a tractor.

18. Soil-processing machine according to claim 1, wherein on the further machine frame provided on the rear end of the soil-processing machine a drive unit is provided and that the coupling arrangement comprises a steering linkage arrangement for coupling the machine frame providing a front end of the soil-processing machine to the further machine frame so that the soil-processing machine can swivel about a steering linkage axis.

19. Soil-processing train comprising a tractor and a soil processing machine according to claim 1 attached to the tractor.

20. Process for removing a soil-processing roller from a soil processing, wherein the soil-processing machine includes a machine frame with two longitudinal beams substantially extending in the longitudinal direction of the machine and two transverse beams substantially extending transverse to the longitudinal beams, a soil-processing roller supported on the longitudinal beams between the transverse beams so that the soil-processing roller is able to rotate about an axis of rotation of the roller, a coupling arrangement provided on the machine frame for coupling the machine frame to a further machine frame of the soil-processing machine or to a further machine, and a lifting/supporting arrangement for raising and/or supporting the machine frame in relation to a ground is provided on the machine frame, wherein one of the transverse beams is pivotally supported on both longitudinal beams so that said one of the transverse beams is able to swivel about a swivel axis relative to the longitudinal beams, and wherein said swivel axis is substantially parallel to the axis of rotation of the roller, the method comprising:
  a) Positioning the lifting/supporting arrangement in such a way that the machine frame is supported with the soil-processing roller supported on a floor by the lifting/supporting arrangement in relation to the floor,
  b) After undertaking the measure a), releasing the soil-processing roller from the longitudinal beams;
  c) Before or after undertaking measure b), swivelling one of the transverse beams to a roller-installation position, and
  d) After undertaking measures b) and c), moving the machine frame in relation to the soil-processing roller substantially in the longitudinal direction of the machine frame.

21. Process according to claim 20, wherein before undertaking the measure d), the machine frame may be raised by means of the lifting/supporting arrangement in such a way that when undertaking measure d) the machine frame can be moved away over the soil-processing roller with transverse beam swivelled into the roller installation position.

* * * * *